INVENTORS:
MIKLOS TANNENBAUM, LADISLAO KUN,
GERHARD BRÜCK, AND PABLO SOLTESZ
BY

United States Patent Office 2,789,667
Patented Apr. 23, 1957

2,789,667

AUTOMATIC BRAKE FOR MOTOR VEHICLES

Miklos Tannenbaum, Ladislao Kun, Pablo Soltesz, and Gerhard Brück, Montevideo, Uruguay Application July 14, 1954, Serial No. 443,344

7 Claims. (Cl. 188—110)

The present invention relates to an automatic brake for a self-propelled vehicle and is particularly applicable to automotive brake systems.

The experienced automobile driver sets the hand brake when he parks his automobile and releases the hand brake when he starts the automobile. This is elementary since if the hand brake is not set there is the possibility that the car may roll, and on the other hand if the brake is not released prior to moving the automobile, the brake lining of the hand brake becomes worn out and the added drag of the brake overtaxes the engine. While it is true that every driver is aware of these driving rules and their consequences if not followed, very often, due to absentmindedness, the driver either forgets to set the hand brake when he stops the vehicle or to release the same when he starts it.

It is an object of the present invention to provide an apparatus which automatically releases the hand brake when a vehicle is started and which automatically engages the hand brake when the vehicle is parked.

With the above object in view the present invention comprises an electromechanical system actuated by the starting switch of the vehicle. When the switch is turned on, the system automatically releases the brake, and when the switch is turned off, the system automatically sets the brake.

Figure 1:
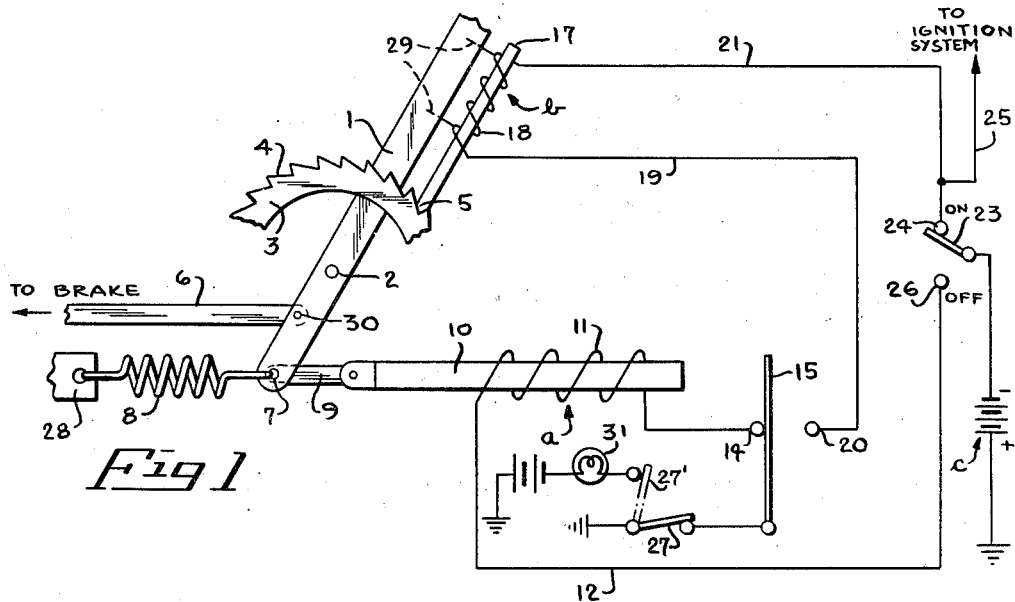
Figure 2:
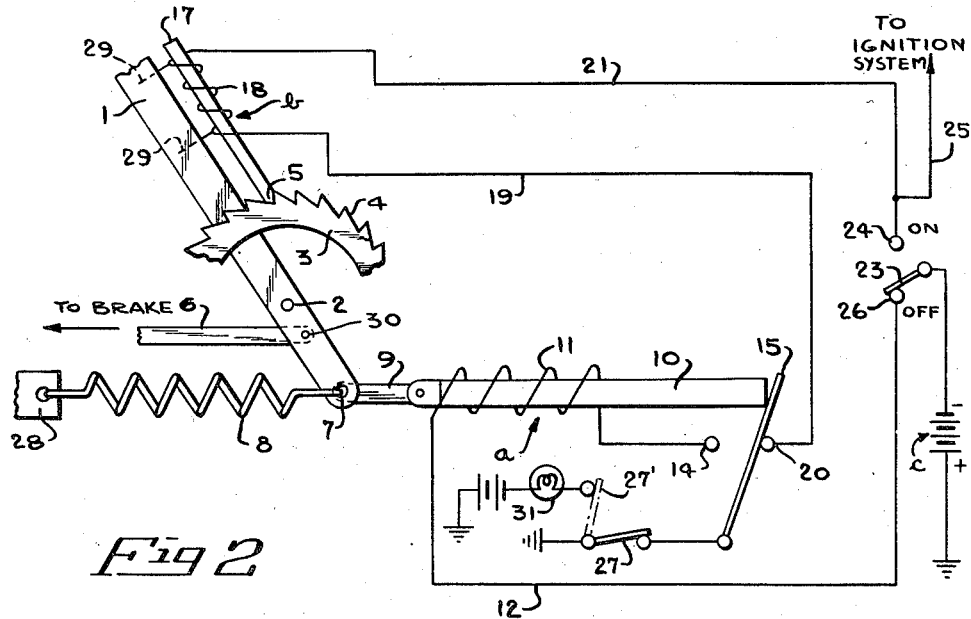

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Fig. 1 is a circuit diagram of the present invention showing the hand brake in the released position; and Fig. 2 is a circuit diagram of the invention showing the hand brake set.

In the drawing like reference numerals refer to like elements.

Referring now to Figs. 1 and 2, there is shown hand brake lever 1 which is pivotally mounted on shaft 2, the shaft being secured to a portion (not shown) of the automobile chassis. Secured to the lever by means of a pivotal connection 30 is a rod 6 which leads to the brake. In the position of lever 1 shown in Fig. 1, the brake is released, and in the position thereof shown in Fig. 2, the brake is engaged. In order to retain the brake lever in a predetermined position there is provided a metal sector 3 provided with teeth 4 which are adapted to be engaged by the end 5 of armature 17.

Lever 1 is spring-biased by means of a heavy spring 8 which is secured at one end to a portion 28 of the automobile chassis and at the other end thereof to the end 7 of the lever member. This spring tends to maintain the lever 1 in the position indicated in Fig. 1, that is, in a position such that the brake is released.

In accordance with the invention lever member 1 is provided with an electromagnet b which is mechanically secured to the lever by a mechanical connection indicated schematically by dashed lines 29. The electromagnet comprises a coil 18 and an armature 17 which is in the position shown in Figs. 1 and 2 when electromagnet b is not energized. The electromagnet circuit includes lead 19 and contact 20 and, when spring member 15 is in the position shown in Fig. 2, spring member 15 and on-off switch 27. The circuit also includes conductor 21, contact 24, and when arm 23 is in the position shown in Fig. 1, arm 23 and battery c.

The system also includes a second electromagnet a having an armature 10 and coil 11, armature 10 being connected to the end 7 of lever 1 by means of connecting rod 9. The circuit of this electromagnet includes conductor 12, contact 26 and, when arm 23 is in the position shown in Fig. 2, arm 23 and battery c. The electromagnet circuit also includes, when in the position shown in Fig. 1, contact 14, spring member 15 and on-off switch 27.

In the circuit described above, switch arm 23 and contacts 24, 26 may comprise the ignition key of the automobile. Assuming that the automobile is operating, the ignition key of the automobile is turned on and switch arm 23 is in the position shown in Fig. 1. In this position neither one of the electromagnet circuits is completed.

When the vehicle is stopped and the ignition key is turned off, arm 23 is placed in the position shown in Fig. 2. In this position the circuit to electromagnet a is completed from the negative terminal of battery c through arm 23, contact 26, conductor 12, electromagnet a, arm 14, spring member 15 and on-off switch 27 to ground. When electromagnet a is energized, armature 10 is retracted entirely into the coil 11 and this causes connecting rod 9 to move lever 1 against the tension of spring 8 to the position shown in Fig. 2. During this movement the armature 17 of electromagnet b slides over the teeth 4 of member 3 and the end 5 of the armature engages teeth 4 in the extreme position of the lever. When lever 1 is in the position shown in Fig. 2, the brake is set.

When armature 10 is moved to its extreme energized position, the right end thereof abuts spring member 15 which breaks the circuit of electromagnet a and connects contact 20 to ground through on-off switch 27. In this position then neither coil is energized and no current is drawn from the battery.

When it is desired to start the automobile again, the ignition key is turned to the "on" position which engages arm 23 with contact 24. This completes the circuit to electromagnet b and energization of this electromagnet causes the armature 17 thereof to be retracted into the coil. When the armature is retracted, spring 8 moves the lever into the position shown in Fig. 1. Movement of the lever causes armature 10 of electromagnet a to be moved to the left and this causes spring member 15 to open the circuit of electromagnet b de-energizing the same, and to engage contact 14. When electromagnet b is de-energized, armature 17 thereof drops and the electromagnet system returns to the position shown in Fig. 1.

It will be understood that in the case of an automobile, battery c is the normal storage battery of the automobile. Lead 25 leads to the ignition system of the automobile and as can be seen, the ignition sysem is in circuit when the ignition key is in the on position.

Switch 27, appearing in Figs. 1 and 2, provides another function in the circuit incorporating the principles of the present invention. It can be seen that switch 27 is a single pole, double-throw switch. In the position illustrated, as hereinbefore mentioned, switch 27 is connected to spring member 15. The open contact of switch 27 is connected to a signal lamp 31 which in turn is connected to ground through a battery.

Switch 27 is provided so that the operator of the automobile has manually operable control means for disconnecting the automatic electromagnetic brake system. It is apparent that for some purposes it might be desirable not to have the hand brake set in operative position even though the ignition switch 23 is in the off position. For example it is known that some drivers turn off the ignition of their cars when they are driving downhill. Switch 27 permits them to so operate their vehicles if they desire without automatically applying the electromagnetic brake system.

It can be seen in Fig. 1, that if switch 27 is operated from the illustrated position to its second position, indicated by the dotted line 27', the circuit to armature $a$ cannot be completed regardless of the position of the ignition switch 23. Similarly, in Figure 2, such operation of switch 27 opens the circuit to armature $b$. Therefore, switch 27 provides manually operable means for disconnecting the automatic electromagnetically operated brake system.

However, it is realized that a driver may forget that his automatic braking device is in an inoperative condition. For this purpose, signal lamp 31 is provided. When the switch 27 is operated so that armatures $a$ and $b$ are de-energized, the circuit illuminating signal lamp 31 is closed to ground. This lamp will remain illuminated as long as switch 27 renders the automatic electromagnetic braking system inoperative. This serves to warn the driver and acts as a reminder to place switch 27 in the operative position illustrated. The battery used to energize lamp 31 may be the battery $c$, the storage battery of the car. Lamp 31 may be placed on the dashboard of the vehicle to be in a convenient position for the driver.

In the description above the present invention has been related to the hand brake of an automobile. It should be appreciated, however, that the invention is equally applicable to the foot brake of the automobile and it should also be appreciated that the invention is also applicable to vehicles other than automobiles.

It will be understood that each of the elements described above, or two or more together, may also find a useful application in other types of automatic braking systems differing from the types described above.

While the invention has been illustrated and described as embodied in an automatic braking system for an automobile in which the hand brake of the automobile is actuated by electromagnets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a self-propelled vehicle having a brake lever, a brake actuated by said brake lever, and an ignition key having an on position and an off position, in combination, spring means secured at one end thereof to the chassis of said self-propelled vehicle and at the other end thereof to said brake lever and tending to move said brake lever to a position such that said brake is released; a solenoid having a movable armature one end of which is connected to said brake lever so as to move said brake lever against the tension of said spring bias means to a position such that said brake is set when said solenoid is energized; circuit means connected to said solenoid and said ignition key for delivering energizing current to said solenoid when said ignition key is turned to its off position, whereby when said igniton key is turned to its off position said solenoid is energized and said brake is set; a member having a plurality of teeth along an edge thereof secured to said chassis and located adjacent said lever member; and a second solenoid secured to said brake lever and having a movable armature an end of which is adapted to engage said teeth when said second solenoid is de-energized, whereby when said brake lever is moved by the first-mentioned solenoid to a position such that said brake is set the armature of said second solenoid locks said brake lever in said position.

2. In a self-propelled vehicle having a brake lever, a brake actuated by said brake lever, and an ignition key having an on position and an off position, in combination, spring means secured at one end thereof to the chassis of said self-propelled vehicle and at the other end thereof to said brake lever and tending to move said brake lever to a position such that said brake is released; a solenoid having a movable armature one end of which is connected to said brake lever so as to move said brake lever against the tension of said spring bias means to a position such that said brake is set when said solenoid is energized; circuit means connected to said solenoid and said ignition key for delivering energizing current to said solenoid when said ignition key is turned to its off position, whereby when said ignition key is turned to its off position said solenoid is energized and said brake is set; a member having a plurality of teeth along an edge thereof secured to said chassis and located adjacent said lever member; a second solenoid secured to said brake lever and having a movable armature an end of which is adapted to engage said teeth when said second solenoid is de-energized, whereby when said brake lever is moved by the first-mentioned solenoid to a position such that said brake is set the armature of said second solenoid locks said brake lever in said position; circuit means connected to said second solenoid and said ignition key for delivering energizing current to said second solenoid when said ignition key is turned to its on position for withdrawing the armature thereof, whereby said brake lever is unlocked from its last-mentioned position; and unlocking means in said circuit of said first-mentioned solenoid for opening said circuit when the armature of said first-mentioned solenoid is in its withdrawn position, whereby when said armature of said second solenoid is withdrawn, said spring means moves said brake lever to a position such that said brake is released.

3. In a self-propelled vehicle as set forth in claim 2, said unlocking means comprising a spring member actuated by the movement of said armature of said first-mentioned solenoid.

4. In a self-propelled vehicle as set forth in claim 2, said first and second solenoids including a common means in circuit with said two solenoids for permanently disconnecting said solenoids from said ignition key.

5. In a self-propelled vehicle as set forth in claim 2, both of said circuit means including a storage battery normally used for the ignition system of said self-propelled vehicle for supplying energizing currents to both of said solenoids.

6. In a self-propelled vehicle as set forth in claim 2 said first and second solenoids including a common means in circuit with said two solenoids for permanently disconnecting said solenoids from said ignition key while simultaneously energizing an automatic warning device.

7. In an automobile having a brake lever, a brake actuated by said brake lever and an ignition key for the ignition system of said automobile, said ignition key having an on position and an off position, in combination, spring bias means secured at one end thereof to the chassis of said automobile and at the other end thereof to said brake lever and tending to move said brake lever to a position such that said brake is released; a first solenoid having a movable armature one end of which is connected to said brake lever so as to move said brake lever against the tension of said spring bias means to a position such that said brake is set when said solenoid is energized; a movable spring member fixed at one end thereof with respect to said chassis of said automobile and arranged so that the other end thereof in one position thereof is adjacent the other end of said movable armature so that when said movable armature is withdrawn said other end thereof abuts said other end of said spring member and moves the same to a second position; a battery; means electrically connecting said spring member to one terminal of said battery; means connecting said spring member when in said one position thereof to a terminal of said solenoid; conductive means connecting the other terminal of said solenoid to an opposite terminal of said battery through said ignition key when said ignition key is turned to its off position, whereby when said ignition key is turned to its off position current flows from said battery through said first solenoid and said spring member back to said battery and said armature is withdrawn causing said brake lever to move and to set said brake, said armature also striking said spring member causing the same to move to its second position and to open the circuit of said first solenoid; a member having a plurality of teeth along an edge thereof secured to said chassis and located adjacent said lever member; a second solenoid secured to said brake lever and having a movable armature an end of which is adapted to engage said teeth when said second solenoid is de-energized, whereby when said brake lever is moved by said first solenoid to a position such that said brake is set, the armature of said second solenoid locks said brake lever in said position; conductive means connecting a terminal of said second solenoid to said spring member when the latter is in its second position; and conductive means connecting the other terminal of said solenoid to said battery when said ignition key is turned to its on position, whereby when said ignition key is turned to its on position said second solenoid is energized, the armature of said second solenoid is withdrawn and said spring member moves said brake lever to a position such that said brake is released.

References Cited in the file of this patent

UNITED STATES PATENTS 1,843,966   Adams _____ Feb. 9, 1932